United States Patent [19]

Babayan et al.

[11] Patent Number: 5,310,825
[45] Date of Patent: May 10, 1994

[54] EPOXY MATRIX CONTAINING AMINE HARDENER AND MICROPULVERIZED POLYIMIDE

[75] Inventors: Eduard P. Babayan, Huntington Beach; Hoa X. Nguyen, Santa Ana, both of Calif.

[73] Assignee: BP Chemicals (Hitco) Inc., Santa Ana, Calif.

[21] Appl. No.: 758,194

[22] Filed: Sep. 11, 1991

Related U.S. Application Data

[63] Continuation of Ser. No. 391,907, Aug. 10, 1989, abandoned.

[51] Int. Cl.$^5$ .................... C08L 63/02; C08L 63/04
[52] U.S. Cl. .................... 525/423; 428/414; 428/415
[58] Field of Search .................... 525/423

[56] References Cited

U.S. PATENT DOCUMENTS

| | | | |
|---|---|---|---|
| 3,663,651 | 5/1972 | Traut | 525/423 |
| 4,410,664 | 10/1983 | Lee | 525/423 |
| 4,558,078 | 12/1985 | Draney et al. | 525/423 |
| 4,661,559 | 4/1987 | Gardner et al. | 525/423 |
| 4,692,272 | 9/1987 | Goswami et al. | 525/423 |
| 4,705,833 | 11/1987 | Saito et al. | 525/423 |
| 4,794,148 | 12/1988 | Nakamura et al. | 525/423 |
| 4,954,195 | 9/1990 | Turpin | 525/524 |

FOREIGN PATENT DOCUMENTS 751206  5/1970  Belgium .................... 525/423

OTHER PUBLICATIONS

T. F. Saunders, W. J. Summa, IBM Technical Disclosure Bulletin vol. 17, No. 2, p. 387, Jul. 1974 "Polyimide epoxy flame retardant resin blend".

Primary Examiner—Robert E. Sellers
Attorney, Agent, or Firm—Renner, Kenner, Greive, Bobak, Taylor & Weber

[57] ABSTRACT

The subject invention relates to a toughened epoxy matrix formulation useful as a prepreg for fiber reinforcements comprising at least two epoxy components, an amine hardener and about 10%-25% of a micropulverized polyimide thermoplastic having a molecular weight of from about 20,000 to about 100,000 and Tg of at least about 220° C. The invention further relates to a process for preparing a toughened epoxy matrix formulation comprising:

a. preheating a blend of at least two epoxy compounds to a temperature of about 130° F. to about 140° F.;
b. blending into the epoxy blend from step (a) a micropulverized polyimide thermoplastic;
c. mixing the blend of epoxy and thermoplastic at a temperature of about 110° F. to about 130° F.; and
d. adding to the blend of epoxy and thermoplastic an amine hardener and mixing at about 110° F. to about 130° F. until a low mix viscosity is obtained.

16 Claims, No Drawings

EPOXY MATRIX CONTAINING AMINE HARDENER AND MICROPULVERIZED POLYIMIDE

This is a continuation of co-pending application Ser. No. 07/391,907, filed on Aug. 10, 1989, now abandoned.

FIELD OF THE INVENTION

The subject invention relates to a novel epoxy formulation which exhibits improved damage tolerance and temperature performance. More specifically, the invention relates to the improvement of the properties of epoxy formulations by adding thereto a micropulverized thermoplastic component which comprises between 10-25% of the resulting epoxy matrix.

BACKGROUND OF THE INVENTION

Epoxy resins, due to their good processability combined with good mechanical properties and good high temperature performance, are materials commonly used for the production of high performance composite structures. Such resins usually consist of blends of various epoxies, curatives and additives, which enhance specific characteristics of the epoxy or impart new characteristics to the epoxy. These high performance epoxy matrices, reinforced with fiber, are used widely in the advanced composite industry.

Advanced composites are cured articles resulting from the combination of epoxy or other high performance matrices with a reinforcing fiber, such as glass fiber, aramid fiber (organic fiber), or graphite fiber or fabric, to form prepreg material. In order for prepregs to be useful for manufacturing primary structures, they must possess certain physical and mechanical characteristics. One such characteristic is defined by compression after impact testing, and relates to the retention of compressive strength upon sustained damage to the material. Other desirable characteristics include hot/wet performance, which relates to the performance of the material at high temperatures under humid conditions, working life, and tack and drape, which relate to processability and handleability. Therefore, these materials are evaluated by not only their mechanical performance, but also their handleability and/or processability.

Cured epoxy resins, due to high cross-linking density, display good temperature performance. Unfortunately, however, cured epoxy resin parts lack the needed toughness and are brittle. One solution used to compensate for this brittleness has been to incorporate rubber into the epoxy resin formulation. Rubber tends to improve the toughness of the epoxy by preventing the propagation of cracks and bolstering the strain capability. Other elastomers, such as nylon or liquid reactive oligomers of butadiene acrylonitrile rubbers, have also been used to enhance the toughness in epoxy resin systems.

The use of rubber or other similar elastomeric additives, however, has a significant drawback in that these additives generally possess low modulus and therefore reduce the stiffness of the cured article. The resulting composite material, therefore, displays a commensurate reduction in strength. Also, rubbers and elastomers tend to have low glass transition temperatures, which contributes to the diminished hot/wet performance of composites containing these additives. U.S. Pat. No. 4,680,076 discloses multiphase epoxy thermosets having a crosslinked continuous phase and a crosslinked discontinuous phase which contains a rubber phase.

Reactive oligomers have also been used to enhance the toughness of epoxy resin systems. The resulting systems are characterized by a phase inverted morphology. The most popular thermoplastic oligomer used to toughen epoxy resins has been an amine-terminated polysulfone. Use of this oligomer, however, presents problems in terms of reproducibility, as well as hot/wet performance and out-time. U.S. Pat. No.'s 4,656,208 and 4,656,207 disclose thermoset compositions having multiphase morphology with at least one glassy continuous phase and at least one glassy discontinuous phase, and comprising a polyepoxide component, an amine hardener, and a specified amount of an aromatic oligomer with functional groups which react with the polyepoxide and/or hardener when cured.

More recently, the industry has attempted to solve the toughness problem of epoxy composites by incorporating linear polysulfone thermoplastics into the epoxy formulation. Such polysulfone thermoplastics are specifically tailored to exhibit a spinodal morphology in the cured epoxy matrix. While these thermoplastics do help solve the tughness problem encountered with cured epoxy resins, they only marginally improve the hot/wet performance of the resin as compared to the results achievable when using rubber or elastomers as the additive.

Polyimide thermoplastics have also been used in conjunction with epoxy resins. U.S. Pat. No. 4,567,216 discloses an epoxy composition modified with a thermoplastic to improve tensile properties. The composition contains a bis(2,3-epoxyclyclopentyl)ether, a diamine hardener and a phenoxy, polycaprolactone, polyetherimide or polyarylether thermoplastic. The polyimide thermoplastic is usually combined with the epoxy in a solution blend, requiring that the amount of thermoplastic added be less than 10%. Amounts in excess of 10% polyimide thermoplastic dissolved in the epoxy formulation can not be handled due to the excessive viscosity of the material. The solution of thermoplastic in the epoxy is normally accomplished by either dissolving the two components in a common solvent and removing the solvent while mixing the material, or by heating the thermoplastic and the epoxy to a temperature above the Tg of the thermoplastic and melting the two components together. The high viscosity, as well as poor tack, drape and stiffness, make the matrix unacceptable for hot melt processing or for prepregging. Using less than 10% thermoplastic solution allows the user to control the viscosity of the matrix, however, the resultant composite will not achieve the desired toughness.

It has been found that the rate of increase in viscosity of the epoxy-polyimide thermoplastic blend is much higher than the rate of increase in toughness of the resultant matrix. In other words, the limiting factor for toughening the epoxy with the polyimide thermoplastic has been the exponential viscosity increase, making these materials unsuitable for prepregging purposes.

Therefore, while a greater percentage of polyimide thermoplastic in the resin positively increases the toughness of the resin, anything over about 10-12% polyimide increases the viscosity of the resin to a point where the resin is no longer processable. For prepreg processing purposes, the tolerable limit of addition of polyimide thermoplastic to epoxy resin is in the 8-10% range. Consequently, optimum toughness must be sacrificed in order to maintain processability of the resin.

Therefore, it is an object of the subject invention to provide a novel epoxy resin formulation for use in the advanced composite industry which displays increased toughness, and good processability and handleability, while maintaining good thermal characteristics.

It is another object of this invention to provide a process for producing a toughened epoxy matrix which displays good handleability as well as excellent performance characteristics.

SUMMARY OF THE INVENTION

The subject invention relates to a toughened epoxy matrix formulation comprising at least two epoxy components, an amine hardener and about 10%–25% of a micropulverized polyimide thermoplastic having a molecular weight of from about 20,000 to about 100,000 and Tg of at least about 220° C.

The invention further relates to a process for preparing a toughened epoxy matrix formulation comprising:
 a. preheating a blend of at least two epoxy compounds to a temperature of about 130° F. to about 140° F.;
 b. blending into the epoxy blend from step (a) a micropulverized polyimide thermoplastic;
 c. mixing the blend of epoxy and thermoplastic at a temperature of about 110° F. to about 130° F.; and
 d. adding to the blend of epoxy and thermoplastic an amine hardener and mixing at about 110° F. to about 130° F. until a low mix viscosity is obtained.

The invention also relates to a prepreg prepared from the above-specified novel epoxy matrix formulation and appropriate reinforcements and a process for producing such prepregs.

DESCRIPTION OF THE INVENTION

In accordance with this invention, there is provided a novel epoxy matrix formulation which comprises a blend of at least two epoxy components, an amine hardener and 10–25% of a micropulverized polyimide thermoplastic which is compatible with the epoxy component. This matrix exhibits good toughness and good hot/wet performance, and is useful as a matrix material for primary structures for the advanced composite marketplace. This composite matrix effectively combines the good thermal performance of an epoxy with the toughness and damage tolerance of a thermoplastic to yield a matrix material which is able to maintain each of these characteristics. Further, this matrix displays excellent prepreg processability and ease in handling and cure.

The term "toughness" as used herein refers to the ability of a composite to sustain impact damage and retain structural integrity, especially compression strength. The phrase "hot/wet performance" refers to the retained mechanical strength of the toughened composite at elevated temperatures after exposure to heat and humidity for extended periods of time. Such environmental conditions may cause some weight gain in the composite from absorbed moisture. The reduction in mechanical properties at elevated temperatures is inversely proportional to the amount of absorbed moisture.

The phrase "epoxy matrix" or "matrices" refers to engineering plastics used in fiber-reinforced plastics. More specifically, it refers to aerospace-grade material requiring proper tack, drape, handleability and outlife in the uncured state, and certain measures of thermomechanical performance and damage tolerance in the cured state.

Prepreg "tack" is a qualitative measure of the ability of the material to adhere to itself at ambient temperature without external heat or adhesives. This is an important material trait that allows fabricators to build and maintain stacks of prepreg plies in particular geometries and orientations to satisfy engineering designs before the material has been cured.

Prepreg "drape" refers to the subtleness of the uncured material. Specifically, it refers to the ability of the prepreg to conform to contours, usually a tight radius, without damage to the fiber in the prepreg. Prepreg matrix resins with poor drapeability result in additional labor cost and/or design restrictions, and are thus unattractive to the advanced composite industry.

The term "outlife" refers to the length of time both tack and drape are maintained satisfactorily.

"Flow control" refers to the viscosity behavior of the matrix during cure. In the absence of flow control, resin can flow excessively causing an unacceptable part.

"Glass transition temperature" or "Tg" in this disclosure refers to the maximum of the Complex Loss Modulus (G'') of the matrix via Rheometric Dynamic Spectroscopy (RDS). The "Tg" of the matrix is the temperature above which the matrix loses most of its structural strength. A composite with a high Tg corresponds to a material that has a high use, or "service", temperature. The measurement of Tg is usually determined in the dry state, "dry Tg", as well as after exposure to elevated temperatures and humidities, typically 48 hours in boiling water, or "wet Tg" for screening purposes. The accelerated hydrolytic exposure of boiling water approximates long duration exposure to real-world environmental conditions, and is thus an important consideration to the engineer choosing an epoxy matrix for a particular application.

The toughened epoxy matrix formulations disclosed herein are excellently suited for advanced composite applications. These matrices are extremely tough, and combine good tack, drape and flow control in the prepreg form with a wide window of autoclave cure. The foregoing characteristics and properties prove essential to the functionality and efficiency of the toughened epoxy matrix for the intended purpose.

These formulations further demonstrate excellent processability and handleability at ambient temperatures. The viscosity of the formulation containing the micropulverized, or powdered, thermoplastic and a powdered curative is relatively low, about 20,000 cps at 50° C., compared to other formulated resins commonly used in the advanced composite industry that have viscosities of up to 200,000 to 400,000 cps at the same temperature.

Epoxy matrix formulations such as those disclosed herein possess low initial viscosity and controlled flow, which are very desirable for processability. Further, these formulations are not dependent on complex morphology development, which tends to cause problems in reproducibility. They display excellent hot/wet performance with a dry Tg of up to 392° F., as well as a higher wet Tg of up to 320° F. Hot/wet performance compressive tests of carbon laminates, per accepted ASTM test methods, show results of more than 180 ksi at 180° F. wet, which compare very favorably to competitive toughened systems which display only 150–160 ksi under like conditions. The subject epoxy matrix formulations further display enhanced compression after impact of 45-50 ksi (per accepted major specifications) compared to 17-23 ksi for untoughened systems, and 35-40 ksi for competitive toughened systems.

The subject toughened epoxy matrix formulations comprise a blend of at least two epoxy components, an amine hardener and 10-25% of a micropulverized polyimide thermoplastic component compatible with the epoxy component. The preferred polyimide thermoplastic has a molecular weight of from about 20,000 to 100,000, a glass transition temperature of at least about 220° C., preferably in the range of 250°-300° C., and preferably is present as about 12%-21% of the resulting matrix.

Micropulverization of the thermoplastic prior to addition to the epoxy formulation allows for an increase in the amount of thermoplastic to be added up to 25% of the resulting matrix, thus imparting to the matrix the desired increase in toughness without any degradation in terms of manageable viscosity, handleability and processability. This is a suprising result which we discovered that adding the thermoplastic in the micropulverized form allows the thermoplastic to behave as a filler when used in a prepreg, i.e. it behaves as a nonreactive component, lending texture and a body to the matrix. This behavior is maintained throughout processing and handling, until the prepreg is heated up during cure. As the prepreg is cured, the thermoplastic powder melts into the epoxy matrix, increasing the viscosity and controlling the resin flow, which is highly important because it allows for the resultant cured articles to have a more uniform resin/fiber distribution.

The polyimide thermoplastics useful for the novel toughened epoxy matrix formulation disclosed herein are characterized by high glass transition temperatures, about 220° C. to 300° C., high modulus, and excellent thermal stability. Due to these characteristics, the toughened epoxy matrix formulation containing the micropulverized polyimide thermoplastics, when cured, displays excellent hot/wet performance combined with excellent mechanical properties and the necessary toughness to be usable in advanced composite primary structures. Further, due to the large amount of thermoplastic which can be incorporated into the epoxy/thermoplastic matrix formulation as a micropulverized powder, excellent tack and drape, previously sacrificed to preserve processability, is obtainable. The micropulverized thermoplastic should be about 100-550 mesh, preferably about 200-400 mesh.

The addition of the polyimide thermoplastic to the epoxy formulation in the micropulverized form imparts excellent controlled flow properties to the resulting advanced composite. RDS viscosity profiles for the subject toughened epoxy matrix show viscosity minima of about 1,000 to about 9,000 cps at 60° C. to 78° C., with a rapid increase in viscosity at temperatures above 78° C., due to dissolution of the thermoplastic in the epoxy resin matrix.

Polyimide thermoplastics suitable for use in the present invention include polyimides containing recurring units of the formula:

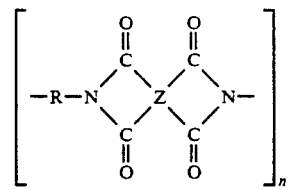

wherein Z is selected from the group consisting of:

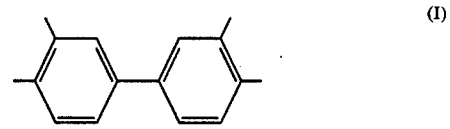 (I)

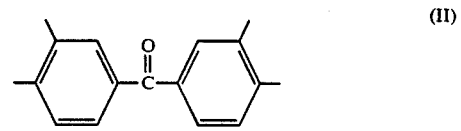 (II)

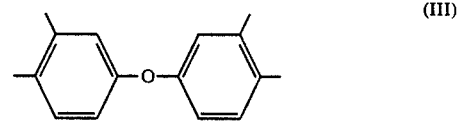 (III)

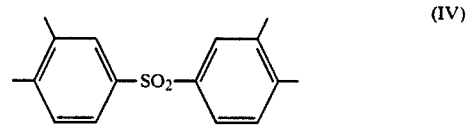 (IV)

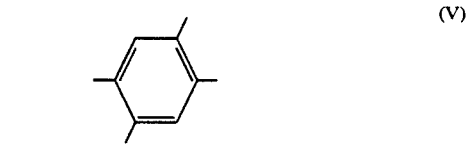 (V)

and R is a diamine selected from the group consisting of:

 (A)

 (B)

 (C)

 (D)

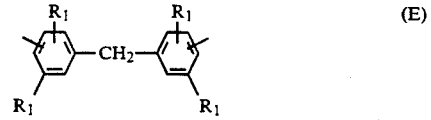 (E)

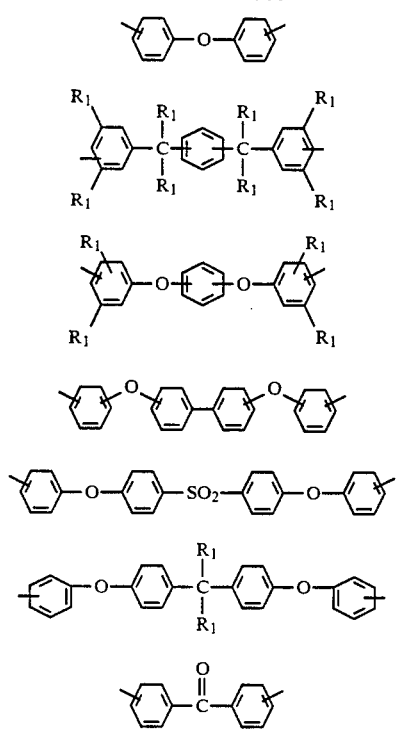

wherein $R_1$ is $CH_3$, $C_2H_5$ or H. The phenylindane diamine component and the other diamine components may consist of one or more isomers or substituted isomers or combinations thereof. Preferred polyimide thermoplastics include BTDA(3,3',4,4'-tetracarboxylic dianhydride) in conjunction with at least one of 5 amino-1-(4 amino phenyl)1,3,3'-trimethylindane, 2,2'bis(3,5-dimethyl-4-amino phenyl)p-disopropyl benzene, 2,2'bis(4 amino phenyl)p-disopropyl benzene, and 4,4'-methylene bis(2,6' dimethylaniline).

The epoxy component of the formulation disclosed herein is characterized by a glass transition temperature of up to about 20° C., and low viscosity. Cycloaliphatic epoxy compounds useable in the invention include vinylcyclohexane dioxide, 4(1,2 epoxy ethyl) 1,2 epoxy cyclohexane, 3,4 epoxy cyclohexylmethyl (3,4 epoxy) cyclohexane carboxylate, and 2-(3,4 epoxy) cyclohexyl-5,5 spiro(3,4-epoxy)-cyclohexane-m-dioxane. Suitable aromatic epoxy compounds include: resorcinol diglycidyl ether (or 1,3-bis(2,3-epoxy propoxy)benzene); diglycidyl ether of bisphenol A (or 2,2-bis(4-(2,2-bis(4-(2,3-epoxypropoxy) 3-bromophenyl)propane); diglycidyl ether of bisphenol F; triglycidyl p-aminophenol (or 4-(2,3-epoxypropoxy)-N,N-bis(2,3-epoxypropyl)aniline); diglycidyl ether of bromobisphenol A (or 2,2-bis(4-(2,2-bis(4-(2,3-epoxypropoxy) 3-bromophenyl) propane); diglycidyl ether of bisphenol F (or 2,2-bis(p-(2,3-epoxypropoxy-phenyl)methane); triglycidyl ether of meta-aminophenol (or 3-(2,3-epoxypropoxy)-N,-N-bis(2,3-epoxypropyl)aniline); tetraglycidyl methylene dianiline (or N,N,N',N'-tetra(2,3-epoxypropyl) 4,4'-diaminodiphenyl methane); N,N,N',N'-tetraglycidyl-4,4'-bisbenzenamine; and low viscosity epoxy novolac resins. It is advantageous in the practice of the invention to use at least two epoxy components. These should be chosen such that at least one has a low viscosity and such that one or both have a high functionality (greater than 2). Preferred combinations of epoxy compounds include mixtures of bisphenol F diglycidyl ether and the triglycidylaminophenols or tetraglycidyl methylene dianiline, and mixtures of the triglycidylaminophenols and the diglycidyl ether of bisphenol F or epoxy novolac resins. Particularly preferred are epoxy components which have glass transition temperatures between about −100° C. and about 20° C.

The amine hardener component used in this novel formulation is preferably an aromatic diamine having a molecular weight below 1000, and more preferably is a compound of the formula:

where $R_1$, $R_2$, $R_3$ and $R_4$ are independently hydrogen, halogen or an alkyl or alkoxy group having 1 to 12 carbon atoms, and X is O, S, $SO_2$, alkylene, alkylindene or oxoalkylene, where m=0 or 1, a phenylene diamine or a heterocyclic diamine.

Aromatic diamines that can be employed are different isomers of diamino diphenyl sulfone, 3,3'-methylene bis(2,6-diethylaniline), 4,4-methylene bis(2,6 dimethylaniline), or p(amino phenoxy)diphenyl ether or sulfone. Particularly preferred aromatic amines are the 4,4'-diamino diphenyl sulfone, 3,3'-diamino diphenyl sulfone and 3,4-diamino diphenyl sulfone.

The hardener is present in the composition in an amount sufficient to cross-link or cure the composition into a thermoset. Preferably, the hardener is present in an amount which provides from 0.6 to 1.5 equivalents, and more preferably from 0.8 to 1.2 equivalents of active hydrogen atoms per one equivalent of epoxide groups in the composition.

The toughened epoxy formulation according to the present invention may also contain polymerization catalysts and processing aids. Preferable catalysts include metal acetylacetonates, blocked Lewis acid-type catalysts or blocked imidazole catalysts.

Processing aids, such as known defoamers, wetting agents and adhesion promoters, may be added to enhance processability or other properties of the resulting toughened epoxy matrix.

The subject toughened epoxy matrix formulation can be prepared by first blending at least two preheated epoxies with the micropulverized polyimide thermoplastic component. The epoxy component should be preheated to 130° F. to 140° F., and mixed at a temperature of about 110° F. to 130° F. The micropulverized thermoplastic, having a particle size of about 100-550 mesh, can then be blended into the preheated epoxy while maintaining the above-specified temperature range.

The exact maximum allowable blend temperature, or critical temperature, will vary with different polyimide thermoplastics used, and one skilled in the art will readily be able to determine at what temperature a given thermoplastic will melt into the resin matrix, and thus what temperature is the upper critical blending temperature for the specific thermoplastic to be used. This temperature will be such that the micropulverized thermoplastic does not dissolve in the polyepoxide and cause a major increase in viscosity.

After about 10-60 minutes of continuous mixing of the epoxy/thermoplastic blend at 110°-130° C., the amine hardener component is added. Mixing should be continued at this temperature for at least 5 minutes in order to achieve a low mix viscosity.

The remaining components of the toughened epoxy matrix formulation disclosed herein may then be added to the formulation, preferably with constant stirring. It is also possible, and often desirable, to add the amine hardener and other components first, followed by the addition of the micropulverized thermoplastic and the catalyst.

For casting purposes, this blend may then be degassed in a desicator while maintaining the temperature at 150°-160° F. After degassing, the blend may be cast in an open mold.

The toughened epoxy formulation, once prepared as described hereinabove, can be used for prepregging. This process involves coating the prepared matrix formulation, at an elevated temperature, on a release paper and sandwiching an appropriate fiber or fabric between the resin films. Unidirectional graphite tapes or graphite fabrics, glass or aramid fibers, or other reinforcements can be used in this or similar techniques to produce prepregs. The impregnated fiber (or prepreg) is layed out into individual plies which are stacked into a laminate of the desired thickness and geometry. Silicone rubber or cork dams are typically used to contain the laminate during cure.

This laminate is typically then covered with a porous release film of teflon and a metal or rubber pressure plate. Next, the laminate is covered with non-porous release film with slits cut into it to vent entrapped gases. The laminate stack is then covered with a fiberglass breathing pad and a nylon vacuum bag. Vacuum is applied under the nylon bag and pressure up to about 100 psi is applied above the bag. The temperature should be ramped at about 2°-5° F./minute to a temperature of about 300° F. to 350° F., at which point the vacuum bag is vented to atmospheric pressure while about 100 psi pressure is maintained above the bag. The laminate is held at about 300°-350° F. with 100 psi for approximately 2 hours, after which the laminate is cooled at about 5° F./minute to below about 150° F.

The above-mentioned cure cycle is given only as an example. Many variations of the lay-up and cure cycle are operative, all of which will be readily apparent to those skilled in the art.

The mechanical properties of the composite made with the prepreg material prepared according to the above process are well-suited for the advanced composite industry. Compression after impact numbers of laminates made according to the invention, as evaluated according to, generally accepted aerospace composite material specifications, are much better than those of non-toughened epoxy systems i.e. typical CAI values are 42-48 ksi after 1500 in-lbs/inch impact energy as compared to 12-17 ksi for non-toughened systems. These materials, however, unlike rubber-toughened systems, also maintain excellent hot/wet performance properties. Strength and modulus values of cured composites made according to the invention are excellent, and property retention is good to at least about 250° F.

EXAMPLES

The following examples demonstrate the formulation of toughened epoxy matrices. In the following examples, the components of the resin formulations are recited by their trade names. The following Table A provides information to further exemplify these components.

TABLE A

| EPOXY | |
|---|---|
| MY 721 | N,N,N',N'-tetraglycidyl-4,4'-bismethyl-benzenamine |
| PY 307 | poly glycidyl ether of phenol novalac resin |
| Epiclon 830 | diglycidyl ether of bisphenol F |
| ERL 0510 | trifunctional epoxy, based on p-aminophenol |
| RD-87-160 | multifunctional epoxy resin |
| THERMOPLASTIC | |
| Matrimid 5218 | reaction product of BTDA and 5-amino-1-(4 amino phenyl) 1,3,3 trimethylindane |
| BTDA | 3,3',4,4'-benzophenone tetracarboxylic dianhydride |
| 1061 Diamine | 2,2'-bis(4-amino phenyl)-p-disopropyl benzene |
| 1062 Diamine | 2,2'-bis(3,5-dimethyl-4-amino phenyl)-p-disopropyl benzene |
| ODPA | oxydiphthalic anhydride |
| AMINE HARDENER | |
| 3,3'-DDS | 3,3'-diamine diphenyl sulfone |

It is to be understood that these examples are utilized for purposes of illustration of matrix formulation only, and are not intended, in any way, to be limitative of the scope of the present invention.

EXAMPLE 1

A blend of 33.0 g PY307 and 28.3 g of MY721 epoxy, both available from Ciba Geigy, was preheated to approximately 130° F. 12.3 g of micropulverized Matrimid 5218 polyimide thermoplastic from Ciba Geigy was then added. The blend was kept at 130° F. under constant mixing. To this blend 26.4 g of 3,3'-DDS curing agent was added and the temperature was raised to 150°-160° F. The mix was kept at this temperature for 5 minutes while mixing. The blend was then degassed while it was maintained at 150°-160° F. and cast into ⅛" thick sheets. These sheets were cured for 2 hours at 350° F.

The dry RDS Tg of this material was 199° C. Another specimen, prepared identically to that above, was kept for 48 hours in boiling water and displayed a wet Tg of 166° C.

The instrumented impact run on a 2.25" diameter casting with a thickness of 140-145 mil gave a peak initial breaking load of 246 lbs., and a total energy under the curve of 3.04 ft.lb.

EXAMPLE 2

A blend of 30.0 g of Epiclon 830 epoxy resin from DIC and 25.5 g of ERL 0510 epoxy resin from Ciba Geigy was prepared following the same procedure as in Example 1. 20.0 g of micropulverized Matrimide 5218 was added, followed by the addition of 24.0 g of 3,3'-DDS. A casting was made using the same procedure as in Example 1. The Tg dry was determined to be 192° C. and the Tg wet was determined to be 145° C. The instrumented impact showed a peak initial breaking load of 332 lbs. and a total energy under the curve of 4.47 ft.lb.

EXAMPLE 3

A blend of 33.0 g of PY307 and 28.3 g of MY721 was preheated to approximately 130° F. as in Example 1. 12.3 g of a micropulverized polyimide based on BTDA and Shell's 1061 diamine was then added. The blend was kept at 130° F. under constant mixing. To this blend was added 26.4 g of 3,3'-DDS The temperature was raised to 150°-160° F. and maintained for 5 minutes while mixing. The blend was then degassed while the temperature was maintained at 150°-160° F., and cast into ⅛" thick sheets and cured at 350° F. for 2 hours. The Tg dry of this material was 173° C., and the Tg wet was 131° C. The peak initial breaking load in the instrumented impact was 289 lbs. and the total energy under the curve was 2.84 ft.lb.

EXAMPLE 4

A blend of 30.5 of Epiclon 830 and 26.5 g of ERL 0510 was prepared following the same procedure as in Example 1. 18.5 g of micropulverized polyimide based on ODPA (oxydiphthalic anhydride) and Shell's diamine 1061 was added, followed by addition of 24.0 g of 3,3'-DDS. To this mix 0.5 g of Cobalt III acetylacetonate catalyst was added and the blend was cured at 300° F. instead of 350° F. The Tg dry of this casting was 188° C. and the Tg wet was 145° C. The instrumented impact gave an initial peak of 273 lbs. and a total energy under the curve of 4.74 ft.lb.

EXAMPLE 5

A blend of 30 g of RD-87-160 available from Ciba-Geigy and 35 g of Epiclon 830 from DIC Corporation was preheated to approximately 130° F. as in Example 1. 21.0 g of a micropulverized polyimide based on BTDA and Shell's 1062 diamine was then added. The blend was kept at 130° F. under constant mixing. To this blend was added 27 g of 3,3'-DDS. Next, 0.5 g to Cobalt III acetylacetonate added. The temperature was raised to 150°-160° F. and maintained for 5 minutes while mixing. The blend was then degassed while the temperature was maintained at 150°-160° F., was cast into ⅛" thick sheets and cured at 300° F. for 2 hours. The instrumented impact showed a peak initial breaking load of 484 lbs. and total energy under the curve of 2.67 ft.lb.

EXAMPLE 6

Following the procedure of Example 1, the following formulations with progressively larger amounts of the micropulverized thermoplastic Matrimid 5218 were prepared and tested. The amounts of the components are given in weight percent.

TABLE B

|  | A | B | C | D | E | F |
|---|---|---|---|---|---|---|
| Epiclon 830 | 33.6 | 32.8 | 31.8 | 31.5 | 31.5 | 30 |
| Ciba 0510 | 29.0 | 28.0 | 27.3 | 26.9 | 26.2 | 25.5 |
| 3,3'-DDS | 26.9 | 26.2 | 25.4 | 25.1 | 24.4 | 24.0 |
| Matrimid 5218 | 10.0 | 12.5 | 15.0 | 16.0 | 18.5 | 20.0 |
| CoAcAc | .5 | .5 | .5 | .5 | .5 | .5 |

The instrumented impact gave the following results:

| Peak Initial Breaking Load lb. | 206 | 207 | 217 | 245 | 297 | 332 |
|---|---|---|---|---|---|---|
| Total Energy ft. lb. | 1.76 | 2.01 | 2.97 | 3.3 | 3.52 | 4.47 |

As can be seen, with increasing amount of thermoplastic both the initial breaking load and the total energy under the curve increased indicating increased toughness of the material.

EXAMPLE 7

Prepregs based on Hitex 46-8B fiber and the resin systems given in Examples 1-4 were made, and 32-ply quasiisotropic (45/0/-45/90)4$_s$ panels were cured. The compression after 1500 in-lb./in. nominal thickness impact was determined for resin systems described in the above-mentioned examples.

|  | Resin from Examples | | | |
|---|---|---|---|---|
|  | 1 | 2 | 3 | 4 |
| CAI (ksi) | 39.5 | 44.2 | 31.2 | 35.0 |

EXAMPLE 8

Several epoxy formulations with increasing amounts of thermoplastic were made. The amount of thermoplastic varied from 6.5 to 13.8%. In the first case, the micropulverized thermoplastic was added to the formulation in accordance to this invention.

In the second case, the thermoplastic was dissolved in methylene chloride, blended with the epoxy and the solvent was removed. To the solvated epoxy thermoplastic the same amount of 3,3'-DDS was added. The RDS viscosity at 50° C. exemplifies the differences and illustrates that the formulations containing more than 12.2% solvated thermoplastic are not handleable.

TABLE C

|  | FORMULATION | | | |
|---|---|---|---|---|
| % THERMOPLASTIC FORMULATION | 1 6.5% | 2 9.6% | 3 12.2% | 4 13.8% |
| EPICLON 830 | 35 | 35 | 35 | 35 |
| CIBA 0510 | 30 | 30 | 30 | 30 |
| 3,3' DDS | 28 | 28 | 28 | 28 |
| MATRIMID 5218 | 6.5 | 10 | 13 | 15 |
| CoAcAc | .5 | .5 | .5 | .5 |
| RDS viscosity - micropulverized thermoplastic (cps) | 1650 | 3720 | 31410 | 36970 |
| RDS viscosity - dissolved thermoplastic (cps) | 59310 | 267400 | 925300 | — |

The RDS viscosity at 50° C. for the formulations made in accordance with this invention, as shown in Table C, were 1650 cps for formulation #1, 3720 cps for #2, 31410 cps for #3, and 36970 cps for #4. This compares very favorably to those formulations where the thermoplastic was dissolved in the epoxy, i.e. 59310 cps for formulation #1, 267400 cps for #2 and 925300 cps for #3. Due to the extremely high viscosity of formulation #4, the 3,3'-DDS could not be added and it was not handleable.

It is to be understood hat the foregoing examples have been provided to enable those skilled in the art to have representative data by which to evaluate the invention and that these examples should not be construed as any limitation on the scope of this invention. Inasmuch as the components of the formulation and process parameters employed in the present invention can be varied within the scope of the total specification disclosure, neither particular components, relative amounts of the components, nor exact operating parameters exemplified herein shall be construed as limitations to the invention.

What we claim is:

1. A toughened epoxy matrix formulation comprising at least two epoxy components, an amine hardener and 12.2% by weight to about 25% of a micropulverized polyimide thermoplastic having a Tg of at least about 220° C.

2. The formulation as in claim 1 containing 12.2% by weight to about 21% of said micropulverized polyimide thermoplastic.

3. The formulation as in claim 1 wherein said micropulverized polyimide thermoplastic is about 100 to about 550 mesh particle size.

4. The formulation as in claim 1 wherein said micropulverized polyimide thermoplastic is about 200 to about 400 mesh particle size.

5. The formulation as in claim 1 wherein said micropulverized polyimide thermoplastic comprises recurring units of the formula:

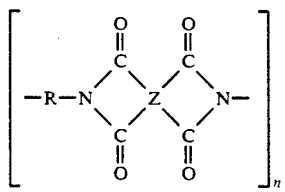

wherein Z is 3,3'4,4-biphenyl tetracarboxylic dianhydride, 3,3'4,4-benzophenone tetracarboxylic dianhydride, 4,4'-oxydiphthalic anhydride, 3,3'4,4'-diphenylsulfone tetracarboxylic dianhydride or pyromellitic dianhydride; and wherein R is a diamine selected from the group consisting of:

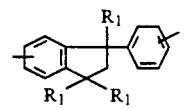 (A)

 (B)

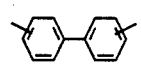 (C)

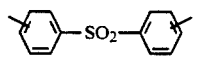 (D)

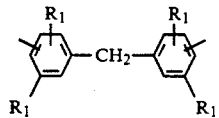 (E)

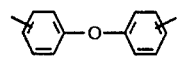 (F)

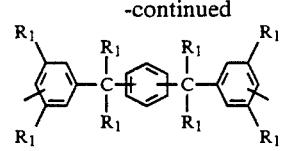 (G)

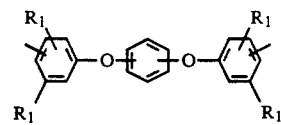 (H)

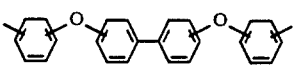 (I)

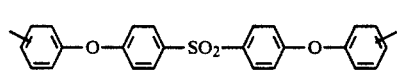 (J)

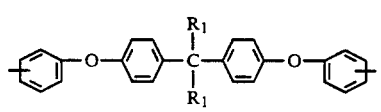 (K)

and

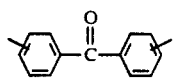 (L)

wherein $R_1$, is $CH_3$, $C_2H_5$ or H.

6. The formulation as in claim 1 wherein said at least two epoxy components are epoxy compounds having Tg of from about $-100°$ C. to about 20° C.

7. The formulation as in claim 6 wherein said at least two epoxy components are selected from the group consisting of vinylcyclohexane dioxide; 4(1,2 epoxy ethyl) 1,2 epoxy cyclohexane; 3,4 epoxy oyclohexylmethyl (3,4 epoxy) cyclohexane carboxylate; 2-(3,4 epoxy) cyclohexyl-5,5 spiro(3,4-epoxy)-cyclohexane-m-dioxane; resorcinol diglycidyl ether (or 1,3-bis(2,3-epoxy propoxy)benzene); diglycidyl ether of bisphenol A (or 2,2-bis(p-(2,3-epoxypropoxy)-phenyl)propane); triglycidyl p-aminophenol (or 4-(2,3-epoxypropoxy)-N,N-bis(2,3-epoxypropyl)aniline); digycidyl ether of bromobisphenol A (or 2,2-bis(4-(2,2-bis(4-(2,3-epoxypropoxy)3-bromophenyl)propane); diglycidyl ether of bisphenol F (or 2,2-bis(p-(2,3-epoxypropoxyphenyl)methane); triglycidyl ether of meta-aminophenol (or 3-(2,3-epoxypropoxy)-N,-N-bis(2,3-epoxypropyl)aniline); tetraglycidyl methylene dianiline (or N,N,N',N'-tetra(2,3-epoxypropyl) 4,4'-diaminodiphenyl methane); epoxy novolac resin; and mixtures thereof.

8. The formulation as in claim 1 wherein siad amine hardener is an aromatic diamine.

9. The amine hardener as in claim 8 wherein said hardener is of the formula:

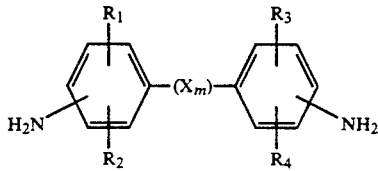

wherein $R_1$, $R_2$, $R_3$ and $R_4$ are independently hydrogen, halogen or an alkyl or alkoxy group with 1 to 12 carbon atoms, and X is O, S, SO$_2$, alkylene, alkylindene and oxoalkylene, and m is 0 or 1.

10. The amine hardener as in claim 9 wherein said hardener is selected from the group consisting of an isomer of diamino diphenyl sulfone, 3,3'-methylene bis(2,6-diethylaniline), 4,4'-methylene bis(2,6-dimethylaniline), p(amino phenoxy) diphenyl ether or sulfone, and mixtures thereof.

11. The amine hardener as in claim 10 wherein said hardener is selected from the group consisting of 4,4'-diamino diphenyl sulfone, 3,3'-diamino diphenyl sulfone, 3,4-diamino diphenyl sulfone, and mixtures thereof.

12. The formulation as in claim 1 wherein said amine hardener provides from about 0.6 to about 1.5 equivalents of active hydrogen atoms per one equivalent of epoxide group.

13. The formulation as in claim 12 wherein said amine hardener provides from about 0.8 to a 1.2 equivalents of active hydrogen atoms per one equivalent of epoxide group.

14. The formulation as in claim 1 wherein said formulation further contains a polymerization catalyst.

15. The formulation as in claim 14 wherein said catalyst is a metal acetylacetonate catalyst, a blocked Lewis acid-type catalyst, or a blocked imidazole catalyst.

16. The formulation as in claim 1 wherein said formulation further contains processing aids.

* * * * *